US009165362B2

(12) United States Patent
Siewerdsen et al.

(10) Patent No.: US 9,165,362 B2
(45) Date of Patent: Oct. 20, 2015

(54) 3D-2D IMAGE REGISTRATION FOR MEDICAL IMAGING

(71) Applicant: THE JOHNS HOPKINS UNIVERSITY, Baltimore, MD (US)

(72) Inventors: Jeffrey Siewerdsen, Baltimore, MD (US); Yoshito Otake, Baltimore, MD (US); Jean-Paul Wolinsky, Towson, MD (US)

(73) Assignee: The Johns Hopkins University, Baltimore, MD (US)

( * ) Notice: Subject to any disclaimer, the term of this patent is extended or adjusted under 35 U.S.C. 154(b) by 238 days.

(21) Appl. No.: 13/888,772

(22) Filed: May 7, 2013

(65) Prior Publication Data
US 2014/0334709 A1  Nov. 13, 2014

(51) Int. Cl.
G06K 9/00 (2006.01)
G06T 7/00 (2006.01)

(52) U.S. Cl.
CPC ..... *G06T 7/0026* (2013.01); *G06T 2207/10072* (2013.01); *G06T 2207/10116* (2013.01); *G06T 2207/10121* (2013.01); *G06T 2207/20016* (2013.01)

(58) Field of Classification Search
CPC .................................................. G06T 7/0012
USPC ................................................. 382/128, 132
See application file for complete search history.

(56) References Cited

U.S. PATENT DOCUMENTS

| 7,660,623 B2 | 2/2010 | Hunter et al. |
| 8,280,491 B2 | 10/2012 | Kuduvalli et al. |
| 2006/0291710 A1* | 12/2006 | Wang et al. .................. 382/131 |

(Continued)

FOREIGN PATENT DOCUMENTS

| WO | 2005024721 A2 | 3/2005 |
| WO | 2012149548 A2 | 11/2012 |

OTHER PUBLICATIONS

Otake et al., Automatic localization of vertebral levels in x-ray fluoroscopy using 3D-2D registration: a tool to reduce wrong-site surgery:, Physics in Medicine and Biology 57 (2012), pp. 5485-5508.

(Continued)

*Primary Examiner* — Tom Y Lu
(74) *Attorney, Agent, or Firm* — Laurence A. Greenberg; Werner H. Stemer; Ralph E. Locher

(57) ABSTRACT

A method of 3D-2D registration for medical imaging includes the following steps: providing a first input interface for acquiring a three-dimensional image; providing a second input interface for acquiring a fixed two-dimensional image using an imaging system that includes a source and a detector and that has an unknown source-detector geometry; initializing image transformation parameters and source-detector geometry parameters; generating a reconstructed two-dimensional image from the three-dimensional image using the image transformation parameters and the source-detector geometry parameters; determining an image similarity metric between the fixed two-dimensional image and the reconstructed two-dimensional image; and updating the image transformation parameters and the source-detector geometry parameters using the image similarity metric, and a corresponding non-transitory computer-readable medium and apparatus.

22 Claims, 14 Drawing Sheets

(56) References Cited

U.S. PATENT DOCUMENTS

2008/0262345 A1    10/2008    Fichtinger et al.
2012/0289821 A1    11/2012    Graumann et al.

OTHER PUBLICATIONS

Navab et al., "3D Reconstruction from Projection Matrices in a C-Arm Based 3D-Angiography System", Siemens Corporate Research, Inc. Princeton, NJ, 1998, pp. 119-129.

McLaughlin et al., "A Comparison of a Similarity-Based and a Feature-Based 2-D-3-D Registration Method for Neurointerventional Use", IEEE Transactions on Medical Imaging, vol. 24, No. 8, Aug. 2005 pp. 1058-1066.

Galigekere et al., "Cone-Beam Reprojection Using Projection-Matrices", IEEE Transactions on Medical Imaging, vol. 22, No. 10, Oct. 2003, pp. 1202-1214.

Otake et al., "Intraoperative Image-based Multiview 2D/3D—Registration for Image-Guided Orthopaedic-Surgery: Incorporation of Fiducial-Based—C-Arm Tracking and GPU-Acceleration", IEEE Transactions on Medical Imaging, vol. 31, No. 4, Apr. 2012, pp. 948-962.

Pluim et al., "Image Registration by Maximization of Combined Mutual Information and Gradient Information", IEEE Transactions on Medical Imaging, vol. 19, No. 8, Aug. 2000, pp. 809-814.

Hansen et al., "Evaluating the CMA Evolution Strategy on Multimodal Test Functions", Parallel Problem Solving from Nature, PPSN 2004.

Cabral et al., "Accelerated Volume Rendering and Tomographic Reconstruction Using Texture Mapping Hardware", Silicon Graphics Computer Systems, IEEE 1995, pp. 91-98 and p. 131.

Siddon et al., "Fast calculation of the exact radiological path for a three-dimensional CT array", Med. Phys. 12 (2), Mar./Apr. 1985, pp. 252-255.

Long et al., "3D Forward and Back-Projection for X-Ray CT Using Separable Footprints", IEEE Transactions on Medical Imaging, vol. 29, No. 11, Nov. 2010, pp. 1839-1850.

Rogelj et al., "Point similarity measures for non-rigid registration of multi-modal data", Computer Vision and Image Understanding 92 (2003), pp. 112-140.

Mehmet Cengiz Çolak et al., "Early detection of retained surgical sponge by the lateral chest radiography", Anadolu Kardiyol Derg, 8, E1:7, 2008.

Hill et al., "Correcting Scaling Errors in Tomographic Images Using a Nine Degree of Freedom Registration", Algorithm. Journal of Computer Assisted Tomography, vol. 22—Issue 2, 1998, pp. 317-323.

\* cited by examiner

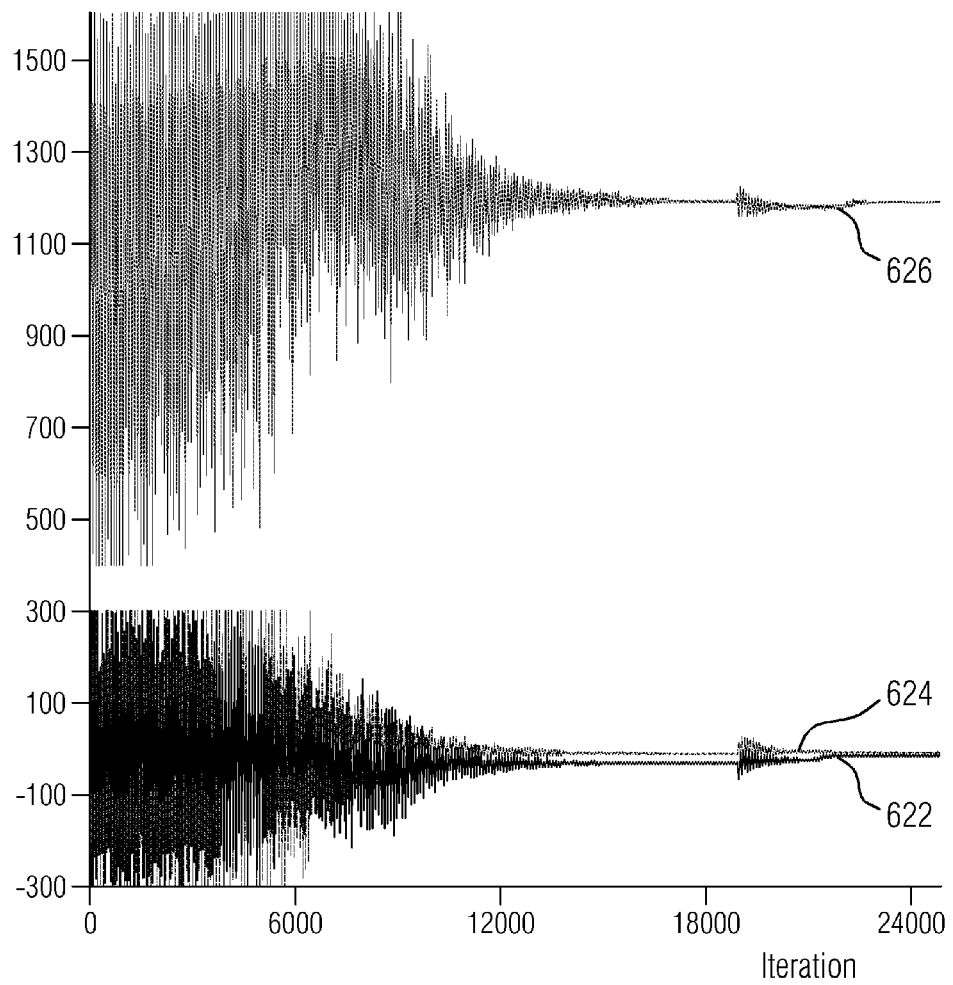

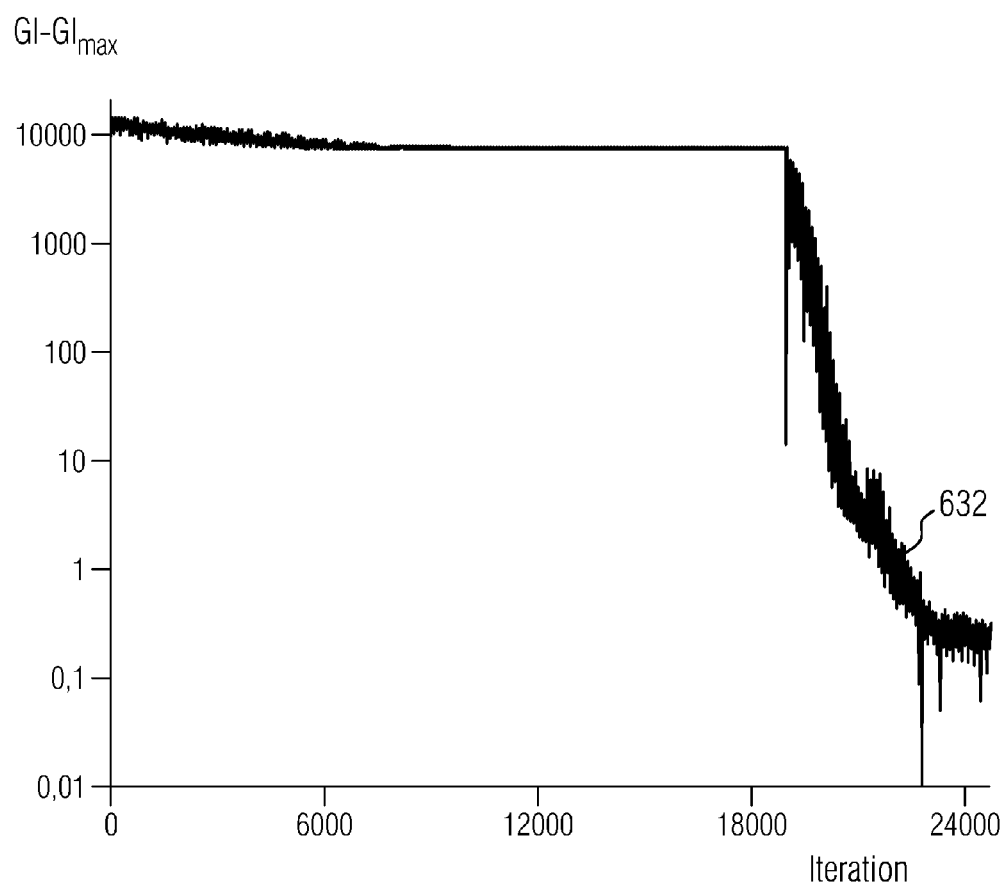

710  750  705

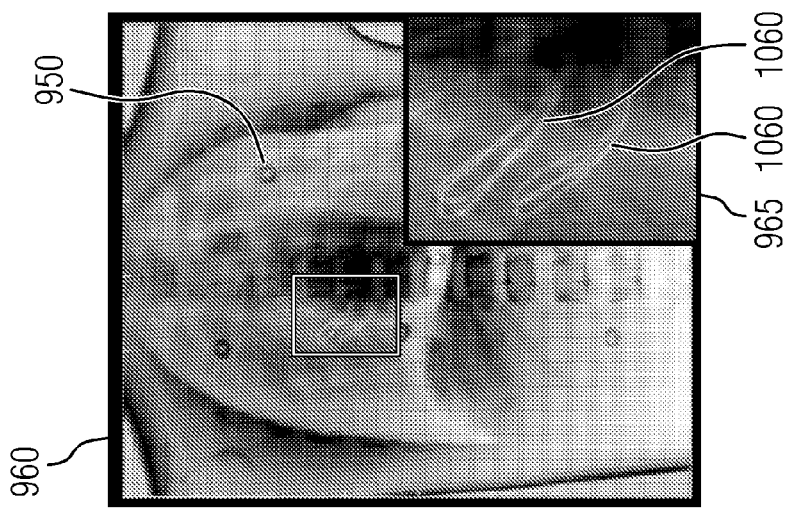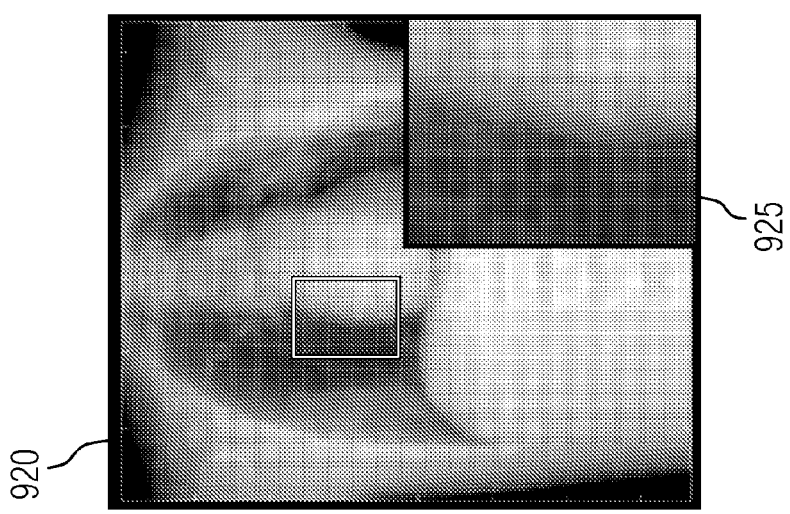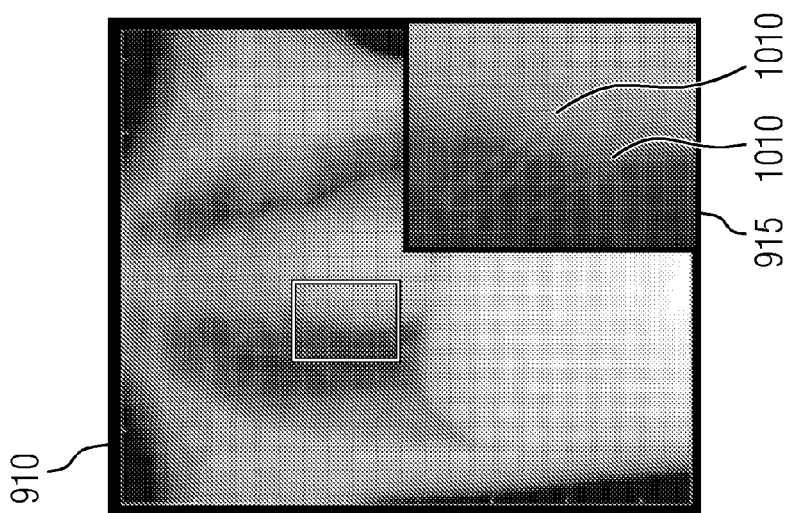

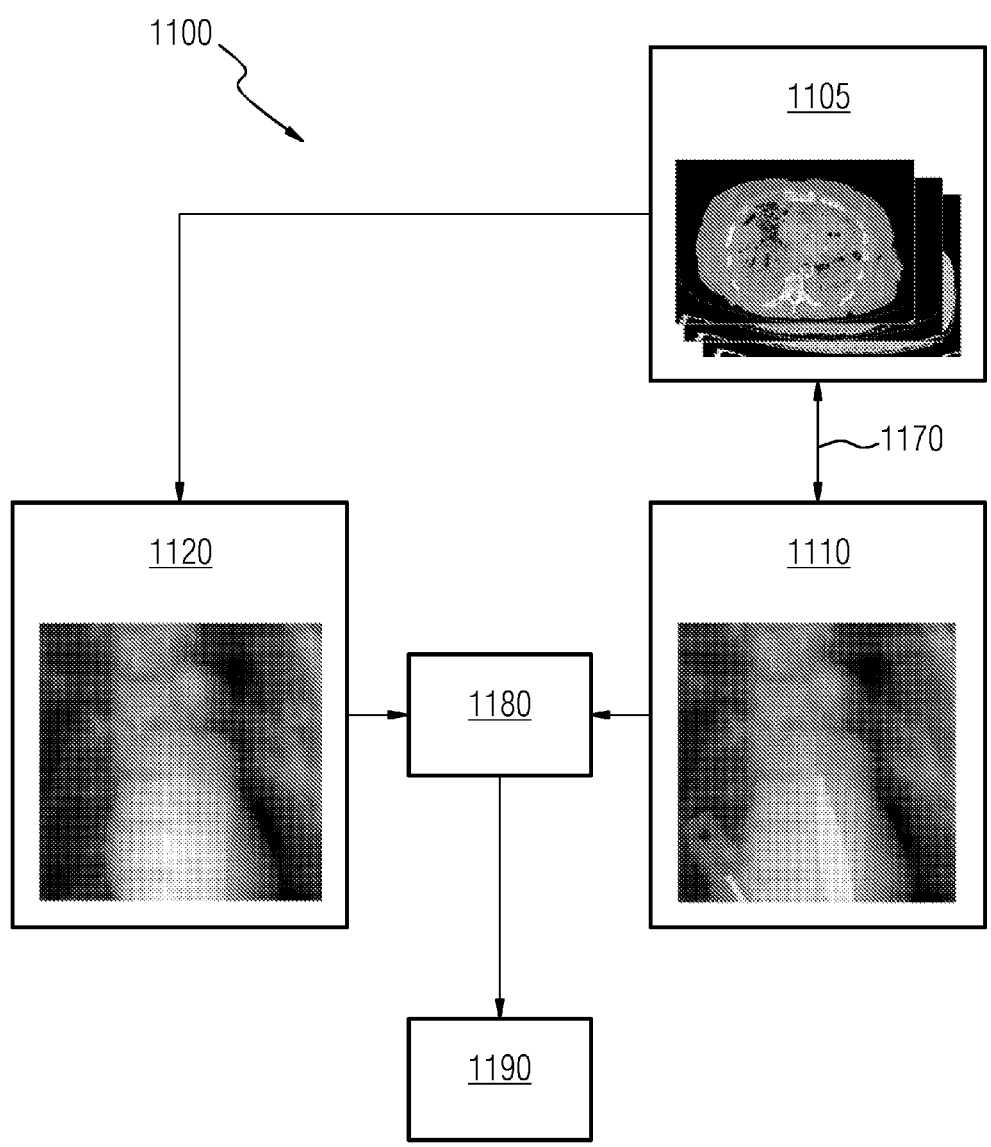

3D-2D IMAGE REGISTRATION FOR MEDICAL IMAGING

BACKGROUND OF THE INVENTION

1. Field of the Invention

The present invention relates generally to 3D-2D image registration and, more particularly, to 3D-2D image registration with nine degrees of freedom (9 DoF).

2. Description of Related Art

Three-dimensional (3D) pre-operative images are ubiquitously used for surgical planning and intra-operative guidance. In surgical planning, a variety of structures, for example surgical devices, needles, prosthetics, intended incisions and anatomical structures, such as a surgical target or an adjacent structure, e.g. a critical structure, are geometrically defined in these 3D images. The intended trajectory as well as desired location and orientation of a structure are defined in a 3D coordinate system of a pre-operative image. More recent advances bring such 3D imaging capability into an operating room (OR) as well as interventional environment, for example interventional radiology (IR) or vascular and interventional radiology (VIR). A planning structure may be similarly defined in 3D intra-operative images.

An incorporation of the pre-operative 3D information into surgical intervention forms a basis for many forms of surgical guidance using a navigation system that leverages various types of rigid as well as deformable registration, for example computation of alignment between two or more coordinate systems such as reference frames of a pre-operative image, an intra-operative image and a coordinate system ("world" coordinate system) at the time of surgery.

In addition to such 3D imaging modalities, a variety of intra-operative 2D radiographic or fluoroscopic imaging systems, for example a mobile x-ray radiographic system, fixed-room x-ray radiography/fluoroscopy system; mobile C-arm for radiography/fluoroscopy or fixed-room C-arm, may be used.

An incorporation of pre-operative 3D information into intra-operatively acquired two-dimensional (2D) radiographs or fluoroscopic images can be achieved via a type of registration called 3D-2D registration (alternatively 2D-3D registration). Such methods have shown significant utility in increasing precision and accuracy of surgery and radiation therapy by bringing 3D pre-operative images and planning structures into the context of 2D images acquired during an operation. For example, in spine surgery, a 3D-2D registration method may be computed to overlay the locations of target vertebral levels that were pre-operatively identified in a 3D computed-tomography (CT) image onto intra-operative 2D radiography/fluoroscopy images [1]. Such registration and visualization may assist a surgeon in localizing the target anatomy, for example a specific vertebral level, and offer numerous advantages with regard to, for example, time, dose, cost and accuracy) in comparison to conventional methods, for example manual level counting and pre-operative fiducial screw placement, which are prone to error and may potentially result in "wrong-level" surgery.

The 3D-2D registration computes the transformation of a 3D image, for example pre-operative CT image or intra-operative CT image, such that a 2D projection image computed from the 3D image, for example a digitally reconstructed radiograph (DRR), provides a best match, in other words yields maximum similarity, to the intra-operative 2D image, for example mobile x-ray radiograph of C-arm fluoroscopy. Therefore, the 3D-2D registration effectively computes a "pose" of the DRR that best matches the true radiograph using an optimization algorithm. Conventionally, this amounts to calculation of the six degrees of freedom (DoF), i.e. the (x, y, z) position and roll, tilt, yaw, yielding the best match. Thus, for a known geometric relationship of the x-ray source and detector, the conventional 3D-2D registration methods solve for these six DoF.

These conventional 3D-2D registration methods require geometric calibration of the imaging system, i.e. the position of the x-ray source relative to the detector is determined and used as input to the registration method. Therefore, the conventional 3D-2D registration methods require that the relative position between the x-ray source and the detector is known. For example, the relative position may be measured by means of a calibration using a specially designed calibration phantom [2]. For example, in the above-mentioned 3D-2D registration method used in spine surgery 3D CT images are registered to mobile C-arm fluoroscopy in which the x-ray source and detector positions are known by means of a prior C-arm geometric calibration, and the 3D-2D registration method solves for the "pose" of the C-arm about the patient. Thus, the conventional methods can work well for a system where the x-ray source is rigidly (or almost rigidly) related to the detector.

However, the geometric calibration limits general application of the conventional 3D-2D registration methods to x-ray imaging systems involving an unconstrained source-detector geometry, for example a mobile x-ray radiography system in which the x-ray source (x-ray tube) is freely positionable above the patient in a manner that is largely unconstrained in angle and distance from the patient and detector and, thus, placement of the x-ray source with respect to the detector changes case by case.

Other imaging systems, wherein the source and detector are unconstrained in their relationship, include, for example, radiographic systems and fluoroscopic systems typical of chest radiography or under-table fluoroscopy.

Thus, a disadvantage of the conventional methods is that the geometric relationship of the x-ray source and detector must be known and fixed.

BRIEF SUMMARY OF THE INVENTION

It is, therefore, an object of the invention, to provide a method of 3D-2D registration for medical imaging, which does not require a known and fixed relative position between the x-ray source and the detector, thereby making no assumption on the geometric relationship of the x-ray source and detector.

This object is solved by a method of 3D-2D registration for medical imaging according to appending independent claims.

According to the invention, the method of 3D-2D registration for medical imaging solves for image transformation parameters and source-detector geometry parameters, for example nine DoF. Thus, the x-ray source may be freely positioned with respect to the (patient and) detector, as possible, for example, with a mobile radiography system.

A method of 3D-2D registration for medical imaging, comprising the steps of: A) providing a first input interface for acquiring a three-dimensional image; B) providing a second input interface for acquiring a fixed two-dimensional image using an imaging system comprising a source and a detector and having an unknown source-detector geometry; C) initializing image transformation parameters and source-detector geometry parameters; D) generating a reconstructed two-dimensional image from said three-dimensional image using said image transformation parameters and said source-detector geometry parameters; E) determining an image similarity metric between said fixed two-dimensional image and said reconstructed two-dimensional image; and F) updating said image transformation parameters and said source-detector geometry parameters using, for example, said image similarity metric and/or an optimization algorithm such as a numerical optimization algorithm. Said method may, for example, be used in surgery, diagnostics and therapy. Said source-detector geometry may, for example, be unknown, because said source and said detector are separate devices and/or are not in a fixed relationship to each other. Said imaging system may, for example, be a radiographic imaging system or fluoroscopic imaging systems, such as a mobile radiography system. Thus, said updating may use said optimization algorithm using said image similarity metric as a cost function.

According to an aspect of present invention the method further comprises the step of: G) repeating steps D to F until said image similarity metric has been maximized.

According to an aspect of present invention said image similarity metric is feature-based or intensity-based.

According to an aspect of present invention said image similarity metric comprises gradient information (GI) between said fixed two-dimensional image and said reconstructed two-dimensional image. Said gradient information may comprise Normalized Gradient Information (NGI). The Normalized Gradient Information is the gradient information between the fixed two-dimensional image and the reconstructed two-dimensional image divided by the gradient information between the fixed two-dimensional image and the fixed two-dimensional image, i.e. itself. Its score may range from 0.0 to 1.0, where a higher score indicates a more reliable 3D-2D registration.

According to an aspect of present invention the method further comprises the step of: h) determining, for example computing, a quality metric quantifying quality of the 3D-2D registration. The quality metric, or quality score, may identify consistent information between the three-dimensional image and fixed two-dimensional image, difficulty of the 3D-2D registration and/or accuracy of the registration, and hence reliability of the registration. The quality metric may be the Normalized Gradient Information.

According to an aspect of present invention said updating uses a numerical optimization algorithm, for example CMA-ES, using the similarity metric as a cost function:

$$\{\hat{t}, \hat{\theta}, \hat{s}\} = \underset{t,\theta,s}{\arg\max}\ GI\,(Image_{fixed},\ Image_{reconstructed}(s_x, s_y, s_z, t_x, t_y, t_z, \theta_x, \theta_y, \theta_z))$$

According to an aspect of present invention said updating uses a parallel optimization.

According to an aspect of present invention said updating uses a coarse-to-fine optimization having multiple resolution levels or two multiple resolution levels.

According to an aspect of present invention said three-dimensional image is a computed-tomography image, magnetic resonance image, positron emission tomography image, synthetic image or an x-ray image.

According to an aspect of present invention said image transformation parameters comprise six degrees of freedom; and said source-detector geometry parameters comprise three degrees of freedom.

According to an aspect of present invention said three-dimensional image is acquired pre-operatively, intra-operatively or post-operatively.

According to an aspect of present invention said fixed two-dimensional image is an x-ray projection image.

According to an aspect of present invention said fixed two-dimensional image is acquired pre-operatively, intra-operatively or post-operatively.

According to an aspect of present invention said imaging system is an x-ray radiography system or x-ray fluoroscopy system.

According to an aspect of present invention said imaging system is a fixed-room system, under-table system, over-table system or mobile system.

According to an aspect of present invention said imaging system further comprises a C-arm.

According to an aspect of present invention said reconstructed two-dimensional image is a digitally reconstructed image.

According to an aspect of present invention the method further comprises the step of: I) generating a visualization image by overlaying said fixed two-dimensional image and said reconstructed two-dimensional image. Thus, said fixed two-dimensional image and said reconstructed two-dimensional image may be mapped or registered to each other.

According to an aspect of present invention said three-dimensional image comprises surgical planning data; said fixed two-dimensional image comprises information on a corresponding surgical result data; and said visualization image verifies or documents said surgical result data. Said planning data comprises information and/or data relating to a device, i.e. its location and/or trajectory, and/or the anatomy and/or the surrounding anatomy within patient's body.

According to an aspect of present invention said three-dimensional image comprises pre-operative information data; said fixed two-dimensional image comprises post-operative information; and said visualization image is able to visualize a retained foreign object. The post-operative information may comprise information regarding the retained foreign object, if present. The method may comprise processing, for example subtracting, the fixed two-dimensional image and the reconstructed two-dimensional image.

According to a further aspect present invention refers to a non-transitory computer-readable medium storing a program causing a computer to execute one of the methods. The computer comprises, for example, a processor executing one of the methods and memory such as volatile memory or non-volatile memory storing instructions implementing the steps, the images and the parameters.

According to another aspect present invention refers to an apparatus for 3D-2D registration for medical imaging, comprising: a first input interface acquiring a three-dimensional image; a second input interface acquiring a fixed two-dimensional image using an imaging system comprising a source and a detector; said source and said detector being separate; said imaging system having an unknown source-detector geometry; an image generator module generating a reconstructed two-dimensional image from said three-dimensional image using image transformation parameters and source-detector geometry parameters; a determination module determining an image similarity metric between said fixed two-dimensional image and said reconstructed two-dimensional image; and a update module updating said image transformation parameters and said source-detector geometry parameters using, for example, said image similarity metric and/or an optimization algorithm.

The term "radiography" refers to the acquisition of a single x-ray projection image.

The term "fluoroscopy" refers to the acquisition of a series (sequence) of x-ray projection images (projections), that may, for example, show motion or real-time guidance.

The term "radiograph" may refer to a single projection image or a sequence of projections, understanding that the invention may be applied to both radiography and fluoroscopy.

The term "six degrees of freedom" (6 DoF) generally refers to the freedom of movement of an object such as a body in 3D space, i.e. freedom to move forward/backward, up/down, left/right, representing translation in three perpendicular axes of a coordinate system, combined with rotation about these three axes ("pitch", "yaw", "roll").

The term "nine degrees of freedom" (9 DoF) refers to the described freedom of movement of the object with additional three degrees of freedom of another object such as a source, for example illumination source or radiation source, representing translation of the source, being independent from translation of the body, in the three perpendicular axes of the coordinate system of a detector receiving and detecting illumination or radiation from the source.

Other features which are considered as characteristic for the invention are set forth in the appended claims.

Although the invention is illustrated and described herein as embodied in a 3d-2d image registration for medical imaging, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 4A-4D are graphs illustrating exemplary convergence of nine registration parameters and a similarity metric value of the 3D-2D registration method according to an initial embodiment of the invention;

FIG. 7A-7C are images illustrating exemplary increase of conspicuity by subtraction of a registered digitally reconstructed radiograph from a real mobile radiograph; and FIGS. 8A-8B are workflow diagrams illustrating exemplary scenarios.

DETAILED DESCRIPTION OF THE INVENTION

The invention offers at least the following advantages.

3D-2D Registration Method With 9 DoF (9 degrees of freedom)

The 3D-2D registration method according to the invention may process 2D images, for example 2D projection x-ray images, acquired with an imaging system having an unconstrained source-detector geometry. It includes parameters, for example additional 3 DoF parameters, representing the source-detector geometry, such that 2D images can be accommodated without knowing the calibration. Thus, it is well suited to imaging systems, for example mobile radiography systems, where the x-ray source may be freely positioned with respect to the (patient and) detector.

The 3D-2D registration method according to the invention may be feature-based or intensity-based. Feature-based methods and intensity-based methods are distinguished by the way that they determine, for example measure or quantify, the similarity between two images. The feature-based method uses extracted features conspicuous in both images, for example contours of the bones or vessels. The intensity-based method uses the intensity of pixels, i.e. pixel values, in the images.

Although intensity-based methods are generally superior in terms of accuracy and robustness [3], the majority of conventional systems commercial systems use feature-based methods due to reduced computational complexity, that is considered to be more suitable to a practical surgical workflow.

As described below, an initial embodiment of the 3D-2D registration method according to the invention is intensity-based. An optimizer uses an image similarity metric to compute the transformation yielding the best match between an acquired 2D image and a reconstructed projection image of the 3D data (image). Further, the initial embodiment uses a graphical processing unit (GPU), resulting in a significant acceleration of processing and making the method feasible for use in an intra-operative system.

Figure 1:
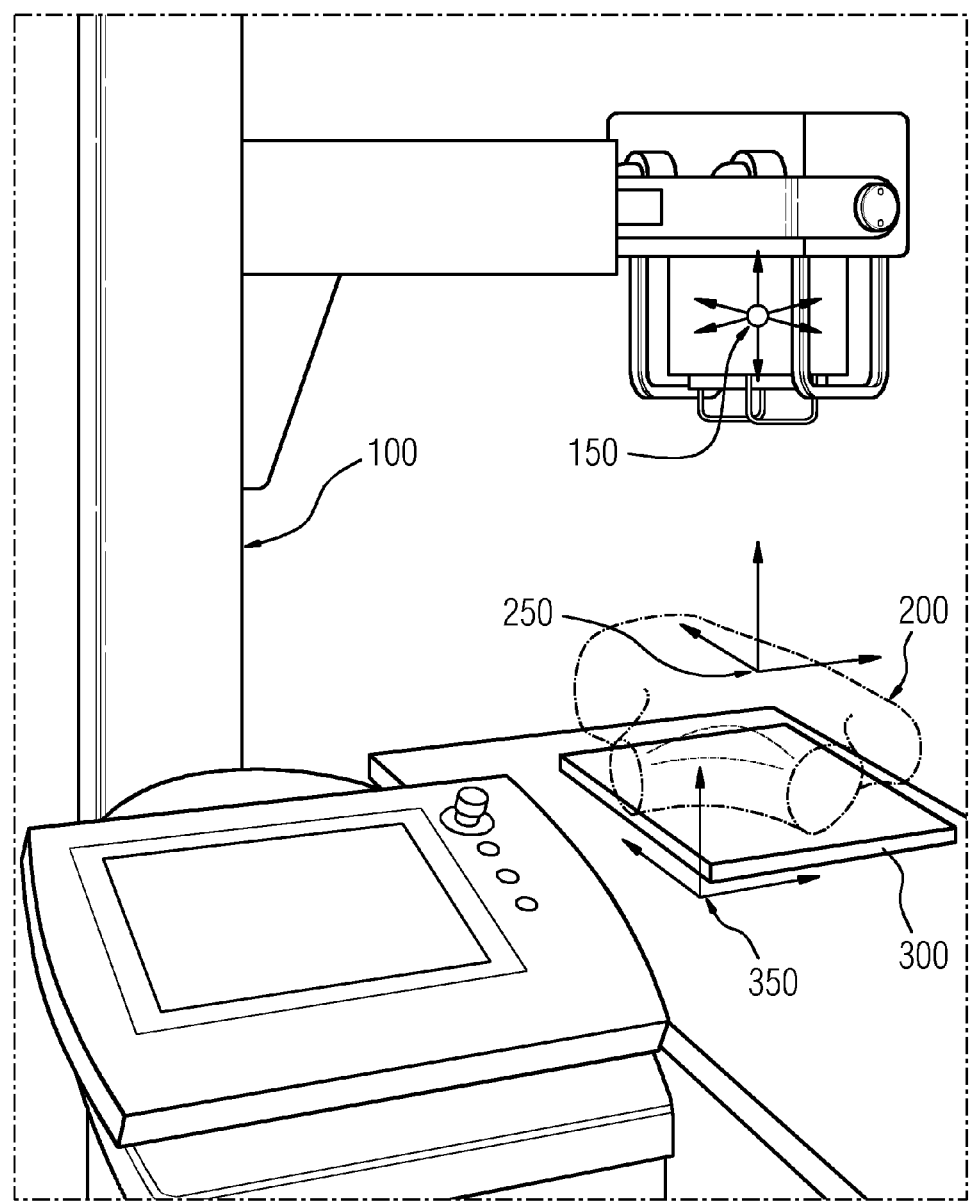
FIG. 1 is an illustration of a mobile x-ray radiography system shown with a chest phantom.

FIG. 1 is an illustration of a mobile x-ray radiography system 100 shown with a chest (anthropomorphic) phantom 200. Beneath the phantom 200 a detector 300 is visible. Reference numerals 150, 250, 250 indicate the coordinate systems, i.e. x-ray source position 150 (3 DoF), patient coordinate system 250 (6 DoF) and detector ("world" coordinator system 350), used in the 3D-2D registration method according to an embodiment of the invention.

The projection geometry in x-ray radiographs relating the patient coordinate system 250 and the x-ray detector coordinate system 350 ("world" coordinate system" as it is used as reference coordinate system) as illustrated in FIG. 1 may be represented by a (3×4) projection matrix p as in equation (1), [4]:

$$\begin{pmatrix} p_1 & p_4 & p_7 & p_{10} \\ p_2 & p_5 & p_8 & p_{11} \\ p_3 & p_6 & p_9 & p_{12} \end{pmatrix} = \begin{pmatrix} s_z & 0 & s_x & 0 \\ 0 & s_z & s_y & 0 \\ 0 & 0 & 1 & 0 \end{pmatrix} \begin{pmatrix} r_1 & r_4 & r_7 & t_x \\ r_2 & r_5 & r_8 & t_y \\ r_3 & r_6 & r_9 & t_z \\ 0 & 0 & 0 & 1 \end{pmatrix} \quad (1)$$

where $(s_x, s_y, s_z)$ denotes the x-ray source position coordinates 150 with respect to the detector coordinates 350 $(t_x, t_y, t_z)$, and the (3×3) rotation matrix r denotes the translation and rotation between the two coordinate systems, i.e. the patient coordinate system 250 and the x-ray detector coordinate system 350. The rotation matrix r has only 3 DoF, and it may be represented using three variables ($\theta_x$, $\theta_y$, $\theta_z$). For the rotation, different types of representation such as Euler angle, Rodriguez vector and unit quaternion may be used. As a regular rectangular detector is assumed, a distortion parameter, for example skew parameter, is not present. However, for a system involving a detector with a non-rectangular detector or non-rectilinear distortion, for example a system comprising an x-ray image intensifier (XRII), being common in clinical use, the 3D-2D registration method may either operate on a distortion-corrected version of the image such as XRII image, or take the distortion parameters directly into account.

A conventional 3D-2D registration method finds the transformation parameters ($t_x$, $t_y$, $t_z$; $\theta_x$, $\theta_y$, $\theta_z$) that maximize similarity between the 2D image and the DRR as in equation (2), using the source position coordinates 150 ($s_x$, $s_y$, $s_z$) known from prior calibration.

$$\{\hat{t},\hat{\theta}\}=\arg\max_{\hat{t},\hat{\theta}} S(\text{Image}_{fixed},\text{Image}_{reconstructed}(t_x,t_y,t_z,\theta_x,\theta_y,\theta_z)), \quad (2)$$

where S(a, b) denotes a similarity metric between image a and image b, $\text{Image}_{fixed}$ denotes the 2D image, and $\text{Image}_{reconstructed}$ denotes the DRR. Thus, the conventional 3D-2D registration method amounts to a solution of 6 DoF, and the resulting DRR is a function of 6 variables.

The 3D-2D registration method according to the invention finds the transformation parameters ($t_x$, $t_y$, $t_z$; $\theta_x$, $\theta_y$, $\theta_z$) as well as three additional variables ($s_x$, $s_y$, $s_z$) representing the source position 150 that is unconstrained with respect to the detector as in the following equation (3).

$$\{\hat{t}, \hat{\theta}, \hat{s}\} = \arg\max_{t,\theta,s} GI \quad (3)$$
$$(\text{Image}_{fixed}, \text{Image}_{reconstructed}(s_x, s_y, s_z, t_x, t_y, t_z, \theta_x, \theta_y, \theta_z)),$$

where ($s_x$, $s_y$, $s_z$) denotes the source position coordinates 150, ($t_x$, $t_y$, $t_z$) denotes detector coordinates 350, ($\theta_x$, $\theta_y$, $\theta_z$) denotes the rotation, and GI denotes the gradient information similarity metric that is optimized in the registration process. Equation (3) shows one form of optimization that has demonstrated advantageous characteristics. However, other optimization algorithms, for examples numerical optimization algorithms, may be envisioned. However, owing to the highly ill-conditioned nature of the problem, i.e. non-linear, non-convex, non-smooth objective function with nine DoF, a stochastic optimization algorithm such as Covariance Matrix Adaptation Evolutionary Strategy (CMA-ES) may also employed to achieve a high robustness.

Further, the 3D-2D registration method according to the invention may employ the gradient information as an image similarity metric. Other similarity metrics may be envisioned.

Furthermore, the 3D-2D registration method according to the invention may employ a coarse-to-fine multi-resolution optimization with two resolution levels. Other multi-resolution schemes may be envisioned.

Thus, the method or apparatus according to the invention may be incorporated in a product for medical imaging, for example a product for radiography such as mobile x-ray radiography, a surgical planning system, a decision support system or an electronic medical record system. The method or apparatus according to the invention may be an integrated part, integrated addition or add-on to the medical system.

Figure 2:
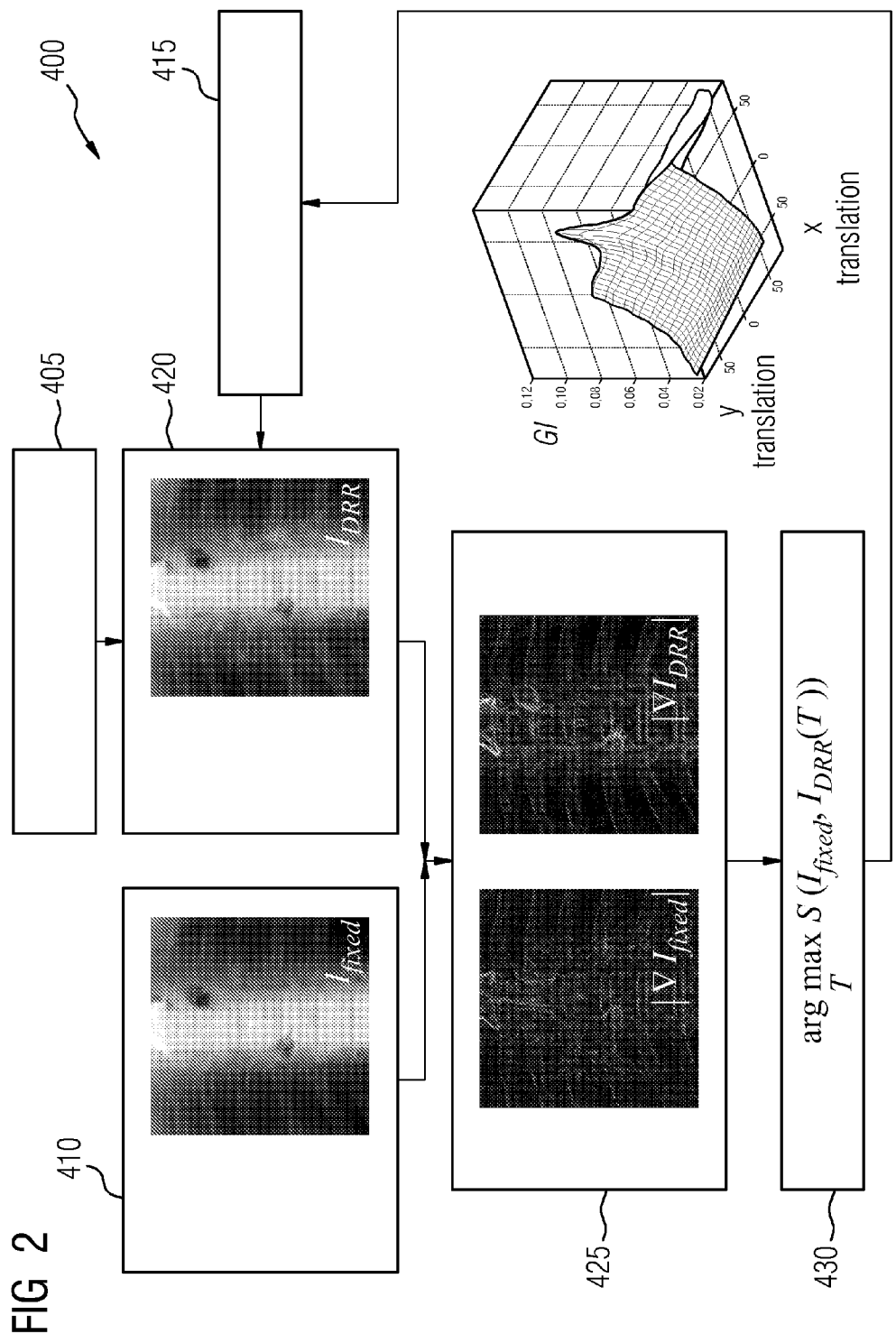
FIG. 2 is a block diagram illustrating the 3D-2D registration method according to an embodiment of the invention.

FIG. 2 is a block diagram illustrating the 3D-2D registration method 400 according to an embodiment of the invention.

The 3D-2D registration method according to an embodiment of the invention comprises providing a first input interface for acquiring a three-dimensional image 405 (3D image, e.g. preop CT).

The method further comprises providing a second input interface for acquiring a fixed two-dimensional image using an imaging system comprising a source and a detector and having an unknown source-detector geometry 410 (Radiograph, fixed image).

The method further comprises initializing image transformation parameters and source-detector geometry parameters 415.

The method further comprises generating a reconstructed two-dimensional projection image from said three-dimensional image 420 (DRR, moving image) using said image transformation parameters and said source-detector geometry parameters (Transformation & Source Position).

The method further comprises determining an image similarity metric between said fixed two-dimensional image and said reconstructed two-dimensional projection image 425 (Similarity function, S ($\text{Image}_{fixed}$, $\text{Image}_{reconstructed}$)).

The method further comprises updating said image transformation parameters and said source-detector geometry parameters using said image similarity metric 430 (Optimizer, arg max S ($\text{Image}_{fixed}$, $\text{Image}_{reconstructed}$ (T))).

Said image similarity metric may comprise gradient information between said fixed two-dimensional image and said reconstructed two-dimensional image. Said gradient information may comprise Normalized Gradient Information. The Normalized Gradient Information is the gradient information between the fixed two-dimensional image and the reconstructed two-dimensional image divided by the gradient information between the fixed two-dimensional image and the fixed two-dimensional image, i.e., itself. Its score may range from 0.0 to 1.0, where a higher score indicates a more reliable 3D-2D registration.

The method may further comprise determining, for example computing, a quality metric quantifying quality of the 3D-2D registration. The quality metric, or quality score, may identify consistent information between the three-dimensional image and fixed two-dimensional image, difficulty of the 3D-2D registration and/or accuracy of the registration, and hence reliability of the registration. The quality metric may be the Normalized Gradient Information.

FIG. 2 illustrates that the gradient information was used for the image similarity metric.

Figure 3A:
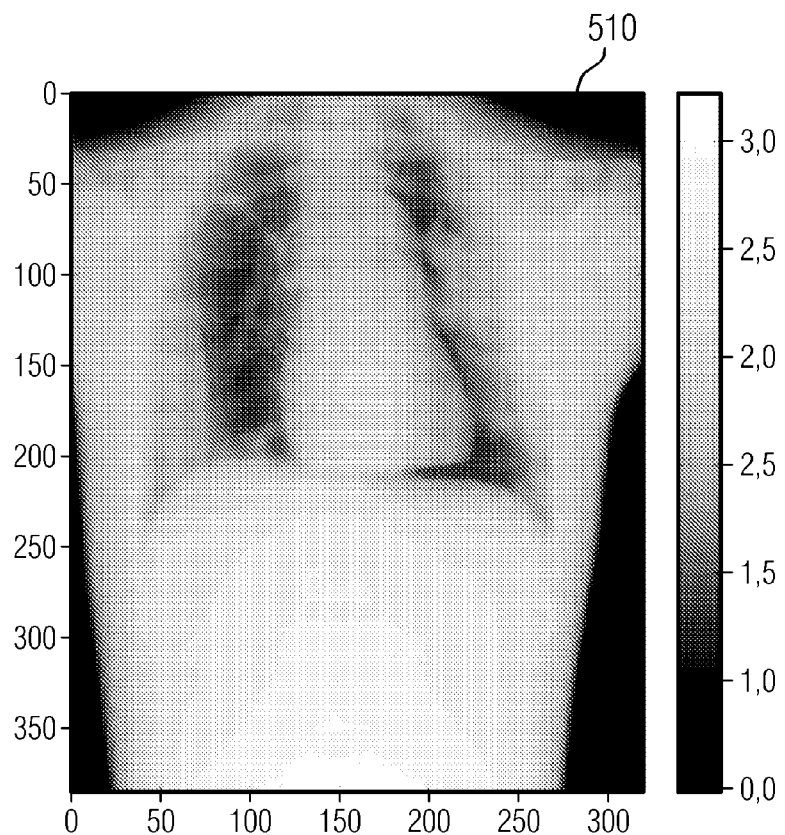
FIGS. 3A-3D are images depicting exemplary results of the 3D-2D registration method according to an initial embodiment of the invention.
Figure 3C:
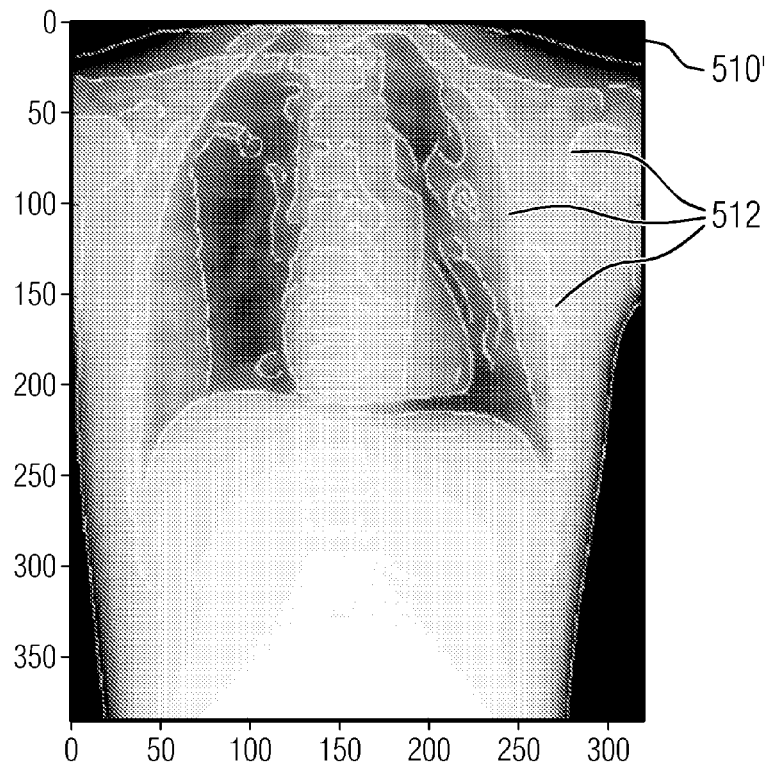
Figure 3B:
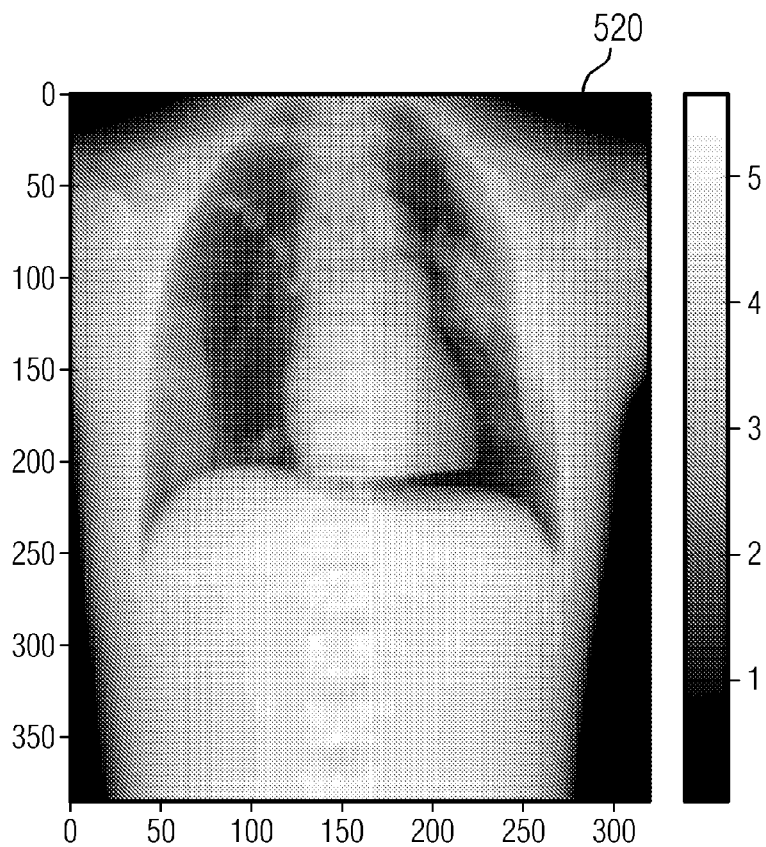
Figure 3D:
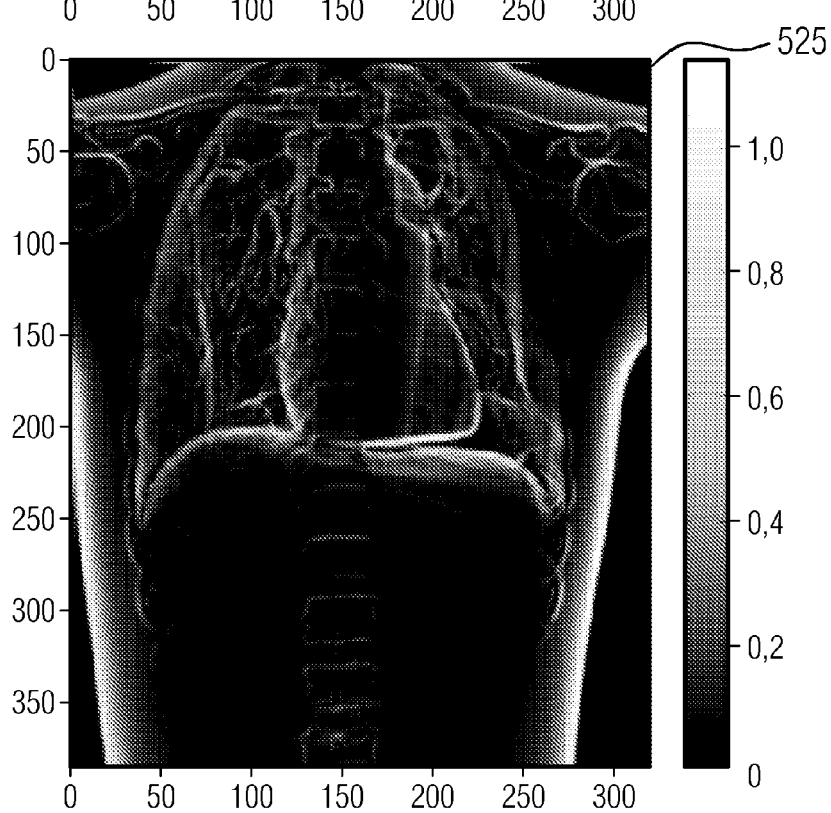

FIGS. 3A-3D and 4A-4D illustrate an example registration. FIGS. 3A-3D are images depicting exemplary results of the 3D-2D registration method according to an initial embodiment of the invention over 24000 iterations, wherein FIG. 3A depicts a target radiograph 510, FIG. 3B depicts a digitally reconstructed radiograph 520 of registered CT data, FIG. 3C depicts the target radiograph 510' overlaid with edges 512 of the digitally reconstructed radiograph 520, and FIG. 3D depicts gradient information between the radiograph and the digitally reconstructed radiograph. As FIG. 2, FIG. 3D illustrates that the gradient information was used for the image similarity metric.

Figure 4A:
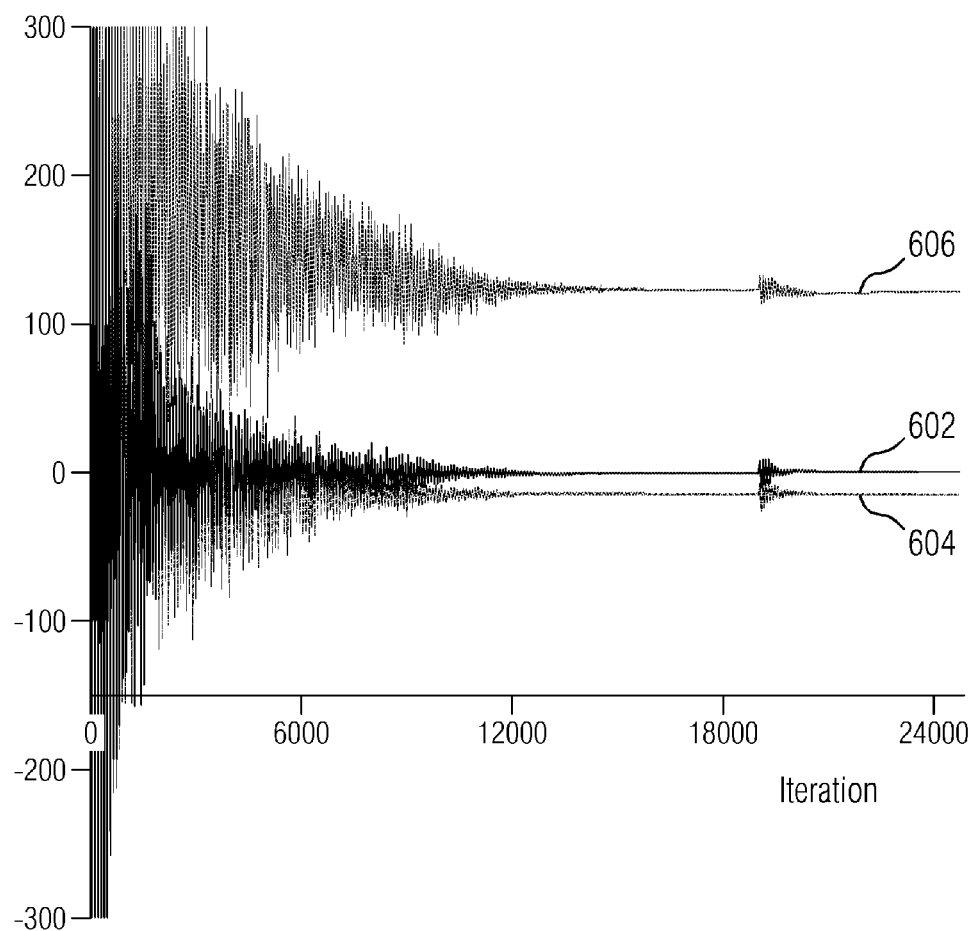
Figure 4B:
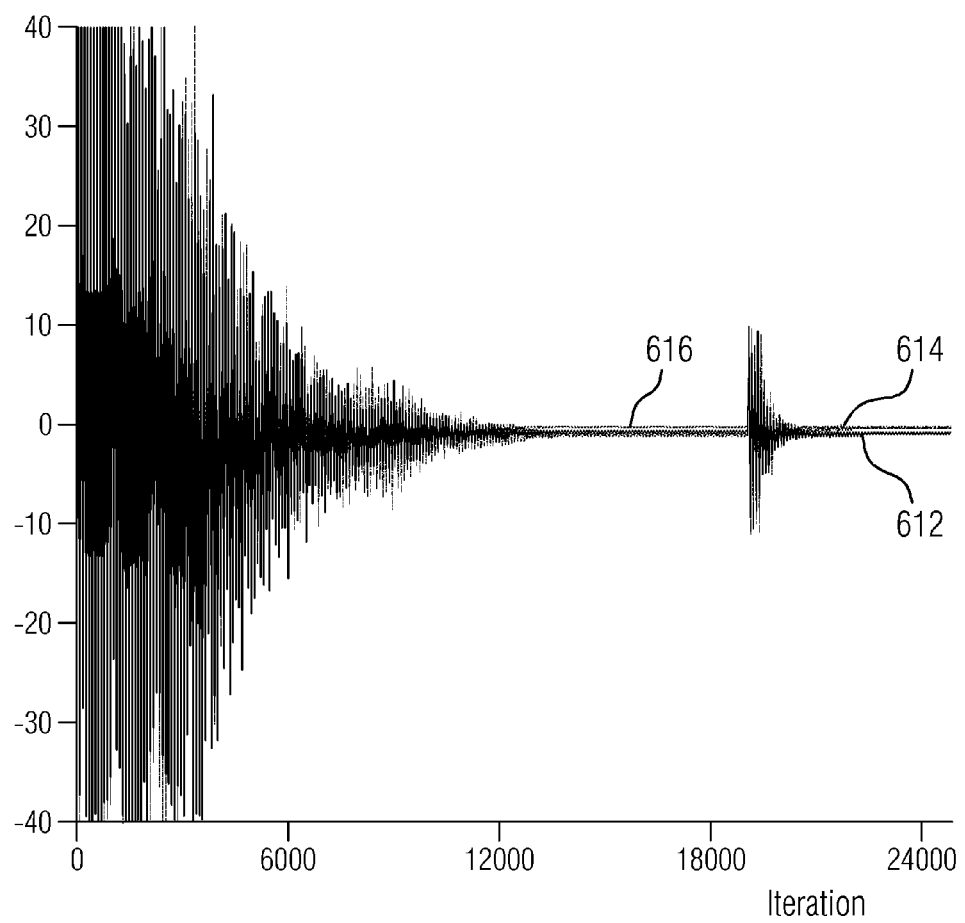

FIGS. 4A-4D are graphs illustrating exemplary convergence of nine registration parameters and a similarity metric value of the 3D-2D registration method according to an initial embodiment of the invention, wherein FIG. 4A depicts translation of a patient, i.e. x translation 602, y translation 604 and z translation 606, FIG. 4B depicts rotation of the patient, i.e. x rotation 612, y rotation 614 and z rotation 616, FIG. 4C depicts a source position with respect to the detector 300, i.e. x coordinate 622, y coordinate 624 and z coordinate 626, and FIG. 4D depicts the gradient information 632, i.e. the difference between maximum value $GI_{max}$ and GI, as similarity metric.

The projection imaging system may be used for the acquisition of a radiograph after closure of a surgical field. A post-operative image provides a useful documentation and/or verification of the surgical result ("surgical product") and may be used to help detect retained foreign bodies (RFBs).

Visualization, Verification and Documentation

The invention may be used for the acquisition of a radiograph, for example showing placement of a surgical device within the body of a patient, for the purpose of documentation and/or verification.

In more detail, the 3D-2D registration method according to the invention may provide the ability to register and fuse/overlay planning data with a mobile radiograph for the purpose of improved visualization and/or verification of the surgical result.

The acquisition of a mobile radiograph at any point in an operation and—perhaps most importantly—at the end of an operation is a useful way to visualize the surgical result. An acquired radiograph depicts the surgical result and demonstrates the instrumentation as actually delivered within the patient. Thus, it is a useful means of documentation and/or verification.

The 3D-2D registration method according to the invention allows surgical planning data, which are generally defined as 3D structures in pre-operative or intra-operative CT images, to be registered to the mobile radiograph. The planning data may include, for example, an intended trajectory of a surgical device such as a needle or screw or prosthetics, a desired final position and orientation of the surgical device or prosthetics, or a volume of interest such as a 3D region demarking pertinent anatomy. The 3D-2D registration method according to the invention allows such structures to be geometrically registered to the mobile radiograph and overlaid in a manner that enhances visualization and verification of surgical delivery. For example, the registration/fusion of the planning data on the radiograph may clearly show the intended trajectory of a device—as defined in planning—relative to the actual trajectory—as seen in the radiograph), the intended final position of the device—as defined in planning—relative to its actual position, the type of instruments to be used or implanted—as defined in planning—compared to the instruments actually seen in the radiograph, and/or a projected boundary of a 3D region of interest—as defined in planning—overlaid on the actual radiograph. These capabilities may improve the ability to visualize, verify and document the procedure.

The method according to the invention may augment a real radiograph, for example mobile radiograph, acquired at the end of an operation by fusing 3D planning structures with the real radiograph. Thus, the method according to the invention may provide, for example a surgeon, with enhanced visualization of the intended plan such as a trajectory and/or device location, relative to the actual surgical result, and it provide for enhanced documentation and verification.

Further, planning data may be defined in a 3D imaging modality, for example MRI, that may in turn registered to a 3D image of another 3D imaging modality, for example CT. Thus, the planning data may be registered to 3D CT image by the same transform. Then, the 3D-2D registration method may, as described, overlay the planning data in 2D, but the planning data were defined in a different modality, for example MRI, not CT.

Furthermore, an image processing method, for example Synthetic CT, may synthesize an image, for example CT-like image or "synthetic CT", from another 3D imaging modality, for example MRI, effectively transforming image values to give image values appropriate to, for example, CT. The 3D-2D registration method may be run on the "synthetic CT" to provide overlay of the planning data in 2D images. As an MRI is acquired, planning is defined in the MRI and a "synthetic CT" is computed as a basis for calculation of the reconstructed image in the 3D-2D registration; this method does not require a CT image.

Figure 5:
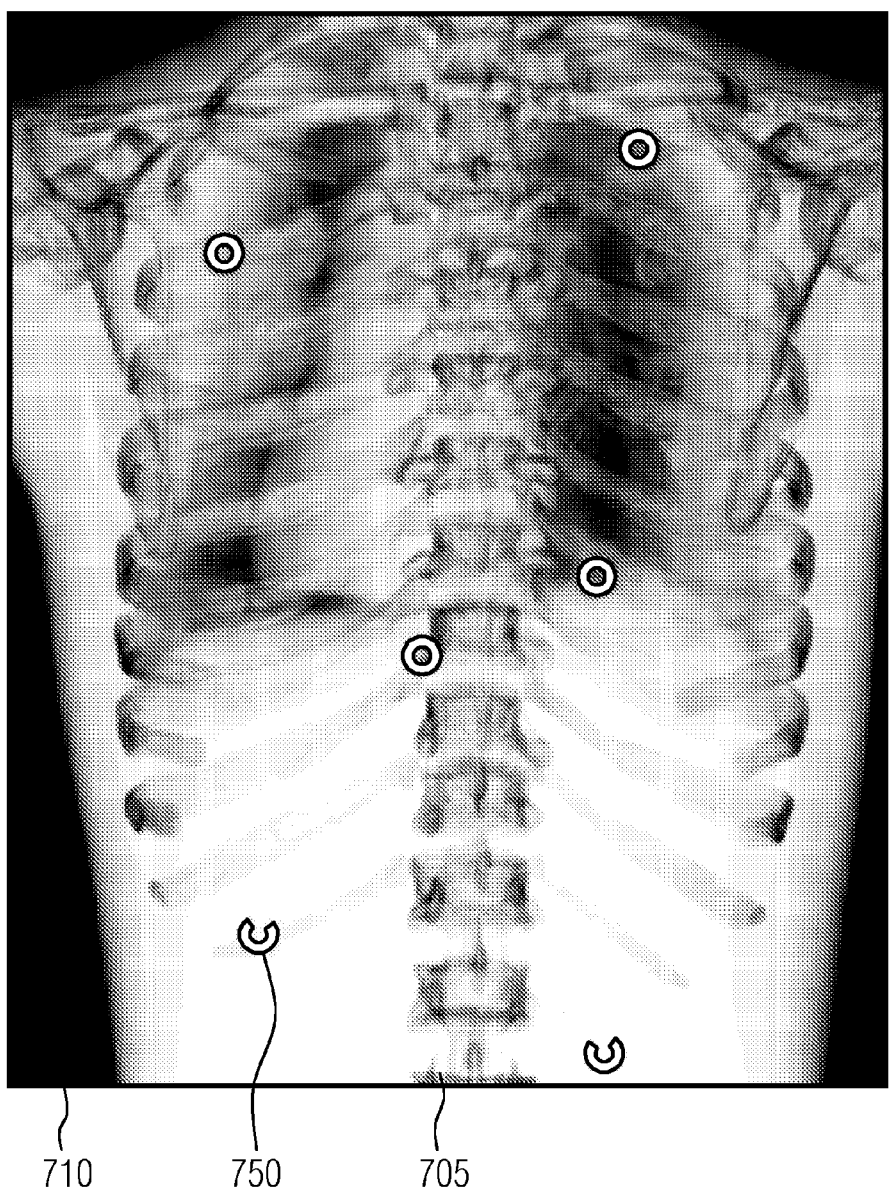
FIG. 5 is an image depicting an exemplary visualization of a 3D preoperative image and planning data (color) registered and overlaid onto a mobile radiograph (grayscale)

FIG. 5 is an image depicting an exemplary visualization of a 3D preoperative image 705 and planning data 750 registered and overlaid onto a mobile radiograph 710.

As a first example, the grayscale image 710 in the background of FIG. 5 is the real radiograph of an anthropomorphic chest phantom 200. An overlay is a fusion of registered 3D structures defined in a pre-operative CT image 705, in this case, segmentation of the bones and a number of fiducial target markers 750 (circular markers).

Figure 6A:
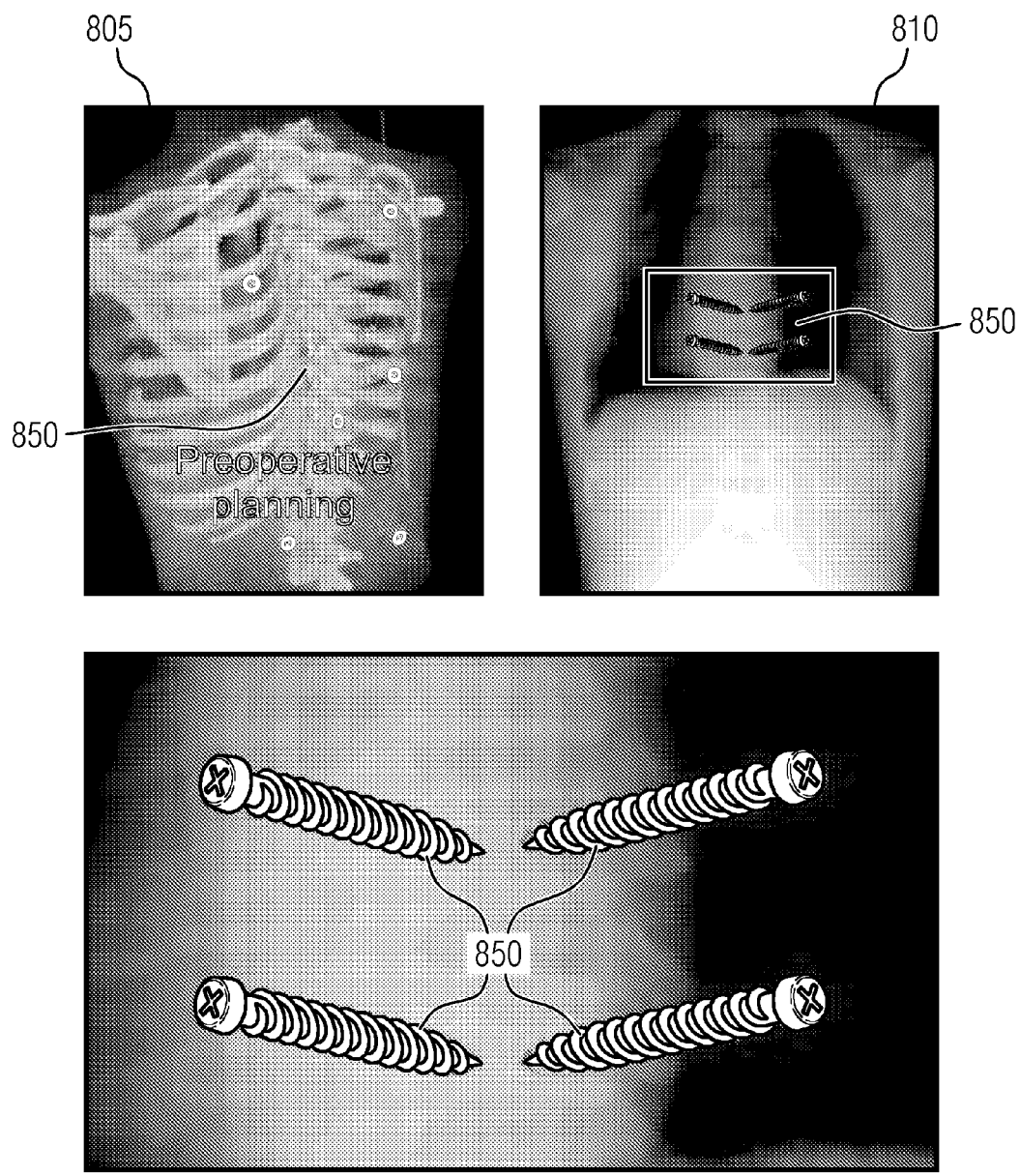
FIGS. 6A and 6B comprise images depicting exemplary visualizations of preoperative planning information registered and overlaid onto a mobile radiograph.
Figure 6B:
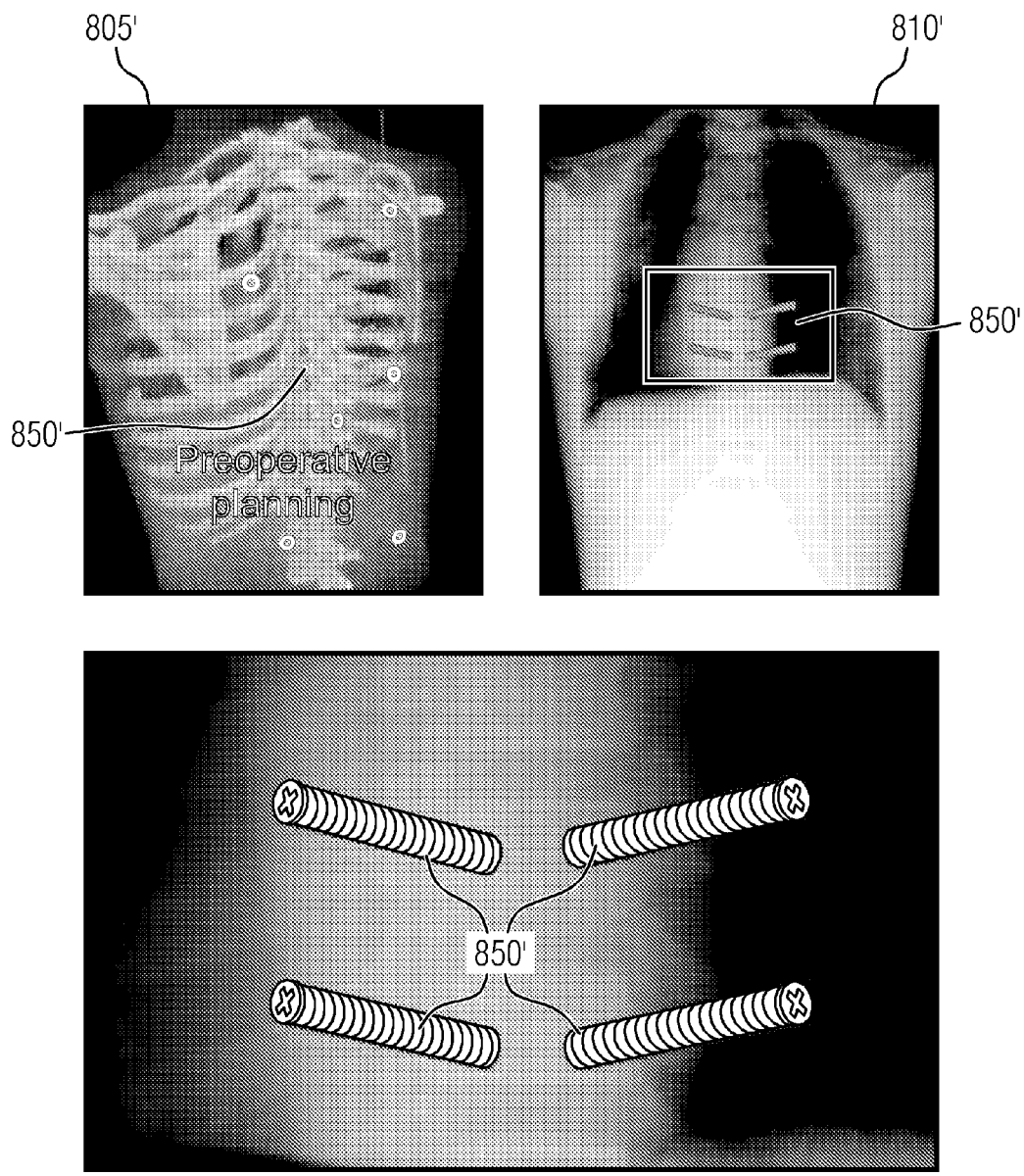

FIGS. 6A and 6B comprise images depicting exemplary visualizations of preoperative planning information, with regard to pedicle screws and their locations, registered and overlaid onto a mobile radiograph.

As a second example, a top-left grayscale image of FIG. 6A shows a pre-operative CT image 805 with the 3D position of various spine screws 850 defined. The top-right image is a real mobile x-ray radiograph 810 overlaid with registered representations of the same spine screws 850. A bottom image of FIG. 6A shows a magnified view. In this case, there were no screws actually delivered to the object, which is a chest phantom 200. However, in actual surgery, the method according to the invention may allow a visual comparison of intended screw placement, i.e. the position of the screw overlays such as colored screw overlays, and true placement—as visible in a post-operative radiograph. A visual mismatch between the two placements would signal, for example to a surgeon, immediately to reconsider and possibly revise the surgery.

FIG. 6B shows a pre-operative CT image 805' with the 3D position of various other spine screws 850' and a real mobile x-ray radiograph 810' overlaid with registered representations of the other spine screws 850' as a third example.

Detection of Changes

The invention may be used for the acquisition of a radiograph for the purpose of detecting a retained foreign body (RFB), for example a clip, an instrument, a needle, a surgical sponge, suture or potentially any item in proximity to the surgical field, that was inadvertently left within the body of the patient.

In more detail, the 3D-2D registration method according to the invention may provide a means of more confidently detecting changes between two images, for example a pre-operative (or intra-operative) 3D image and a 2D image, such as post-operative 2D radiograph. The 3D-2D registration method according to the invention may enhance the conspicuity of RFBs. For example, difference image such as a subtraction of the post-operative radiograph and the reconstructed projection image, is more conspicuous than the original post-operative radiograph. Alternative schemes, for example Mutual Information Maps, may be envisioned.

An intra-operative mobile x-ray radiography system may be used for detecting RFBs, for example, in a case where the count of surgical sponges introduced to the patient does not match the count of sponges removed from the patient. A mobile radiograph may be acquired as a means of non-invasively determining if an RFB was inadvertently retained in the patient. Unfortunately, the conspicuity of the RFB in the radiograph can be fairly low. Even with a mobile radiograph acquired at the end of the case, it can be difficult to visualize the RFB from surrounding anatomy in the x-ray projection. A surgical sponge may even comprise a radiographically opaque marker such as a metal wire for making it more visible in radiographs.

The 3D-2D registration method according to the invention may improve conspicuity of such changes (including RFBs). A simulated 2D projection, such as a DRR, of the registered 3D image with exactly the same geometry as the actual radiograph may be computed from the result of the 3D-2D registration. It allows quantitative comparison/analysis of the pre- and post-operative images which can elucidate the changes occurring between them, including intra-operatively introduced surgical tools or objects that were unintentionally retained in the body, i.e. RFBs. The analysis may be based on a difference image, i.e. a subtraction of the simulated 2D projection image and the actual radiograph, wherein changes may be highlighted, and the conspicuity of differences, for example owing to an RFB, may be enhanced in comparison to the radiograph, and background anatomy may be subtracted away owing to similarity. Thus, a mismatch of contents of the images is detected. The analysis/comparison of the simulated 2D projection image and the actual radiograph may also better distinguish between intended changes, for example owing to the presence of an implant and the deformation/resection of tissues, and unintended changes, for example owing to an RFB. Thus, the quantitative comparison may assist in scrutinizing the surgical result and/or the presence of an RFB. An improved scheme may comprise, for example, searching for, or matching of, pattern of known RFBs, that may be collected in a library.

When a pre-operative image, for example a pre-operative CT image, or an intra-operative image, for example an intra-operative CT image, is used as the 3D image, simulation of a radiograph, that can be quantitatively compared with the real radiograph, may be obtained through the projection matrix computed by 3D-2D registration method according to the invention, and calculation of a reconstructed image by a forward projection algorithm, for example tri-linear interpolation ray tracing, Siddon's ray tracing or Separable Footprint algorithm [8-10]. The real radiograph and the reconstructed image are, therefore, geometrically resolved and suitable for comparison and analysis of differences.

In CT, the intensity value of each volume element (voxel) is represented in Hounsfield Units (HU) and may be converted into a linear attenuation coefficient ($\mu$) as in Equation (4). The negative natural log of the pixel intensity of the radiograph ($I_d$) may be computed as in Equation (5), so that the reconstructed image and the real radiograph carry the same units.

$$\mu = \left(\frac{1000 + HU}{1000}\right)\mu_{water}, \quad (4)$$

where HU represents the intensity value of each voxel and $\mu_{water}$ represents the linear attenuation coefficient of water.

$$g_d = \int_0^d \mu(s)\,ds = -\ln\left(\frac{I_d}{I_0}\right), \quad (5)$$

where $I_d$ represents the pixel intensity of the radiograph and $I_0$ presents the intensity of the unattenuated beam.

A real x-ray beam contains a poly-energetic spectrum, and the actual attenuation at each voxel is defined by the x-ray spectrum and attenuation curve of the material. For simplicity, the x-ray CT image typically assumes mono-energetic x-rays, and a linear relationship between HU and $\mu$ may be assumed as in Equation (4). However, a more sophisticated poly-energetic reconstruction method may be employed, and Equation (4) may be extended to a more sophisticated poly-energetic form.

Further, $I_0$ in Equation (5) is dependent of the x-ray acquisition technique and the source-detector geometry, which are difficult to calibrate. Furthermore, there are numerous other factors, for example x-ray scatter and detector non-ideality, that may be difficult to calibrate and computationally simulate, and, hence, may lead to nonlinear intensity mismatch between the reconstructed image and the real x-ray image. The mismatch may result in differences in intensity, shading and contrast evident in the reconstructed image and the real radiograph.

In the initial embodiment of the invention, mono-energetic x-rays were assumed, and the reconstructed image was computed using a line integral of the linear attenuation coefficient. Since the pixel values in the reconstructed image and the real radiograph—after negative log—may be assumed to have a linear relationship—as in Equations (4) and (5)—a linear fitting between the pixel values was performed to compute approximate values of $\mu_{water}$ and $I_0$.

An additional step of estimating the x-ray attenuation coefficient from the information available in the 3D image may be required for simulation of the reconstructed image, for example if a non-x-ray modality such as MRI is used as the 3D image. The reconstructed image may be computed from the MRI by, for example, first synthesizing an approximate CT image from the MRI, and then computing the reconstructed image as described. A new MRI pulse sequence may produce an MRI with image pixel values proportional, or approximately proportional, to the attenuation coefficient, such that the reconstructed image may be computed directly on the MRI.

The reconstructed image and the real radiograph may be compared by computing a subtraction image, wherein the conspicuity of a change is enhanced relative to the original radiograph, since surrounding background anatomy, which is the same in both the reconstructed image and the radiograph, are subtracted away. In an initial form, this may not solve a "deformable" registration between the 3D image and the radiograph, as a tissue deformation would also exhibit as a changes in the subtraction image. Example changes that would be more conspicuous in the difference image include a region of resected tissue, a device placed within the patient and a RFB.

FIG. 7A-7C are images illustrating exemplary increase of conspicuity by subtraction of a registered digitally reconstructed radiograph 920, being computed from preoperative CT data, from a real mobile radiograph 910, wherein FIG. 7A depicts the real radiograph 910, FIG. 7B depicts the registered digitally reconstructed radiograph 920 being computed from the preoperative CT data, and FIG. 7C depicts a subtraction image 960 resulting from the difference of the real radiograph 910 of FIG. 7A and registered digitally reconstructed radiograph 920 of FIG. 7B. Each of FIGS. 7A-7C comprises an enlarged image 915, 925 and 965 whose location is indicated by a rectangle in images 910, 920 and 960. In FIG. 7A, note the subtle presence of two wire loops 1010, indicating surgical sponges, in the pericardiac/mediastinal region. Further, in FIG. 7C, note an increased conspicuity of the wire loops 1060 as well as a number of circular markers 950 placed during surgery.

Thus, rather than a simple difference image, a more sophisticated method, for example computing a point-wise mutual information (pMI), wherein an area of the resulting map with low pMI suggests a change, may be used to quantitatively compare the reconstructed image and the real radiograph [11].

Potential Workflow

As described, a typical workflow scenario for, for example, the purposes of planning, detecting a RFB or visualizing/documenting the surgical result, comprises acquisition of a pre-operative CT 3D image and subsequent acquisition of an intra-operative 2D radiograph, typically at conclusion of the case, following closure of the surgical site, but still in the OR. The 3D-2D registration method according to the invention then operates in the manner described above to register the 3D and 2D images—including 9 DoF required for a mobile radiography system —, to enhance the visualization/documentation of the surgical result, and to increase the conspicuity of any RFB. This basic workflow is illustrated in FIG. 8A.

Figure 8B:
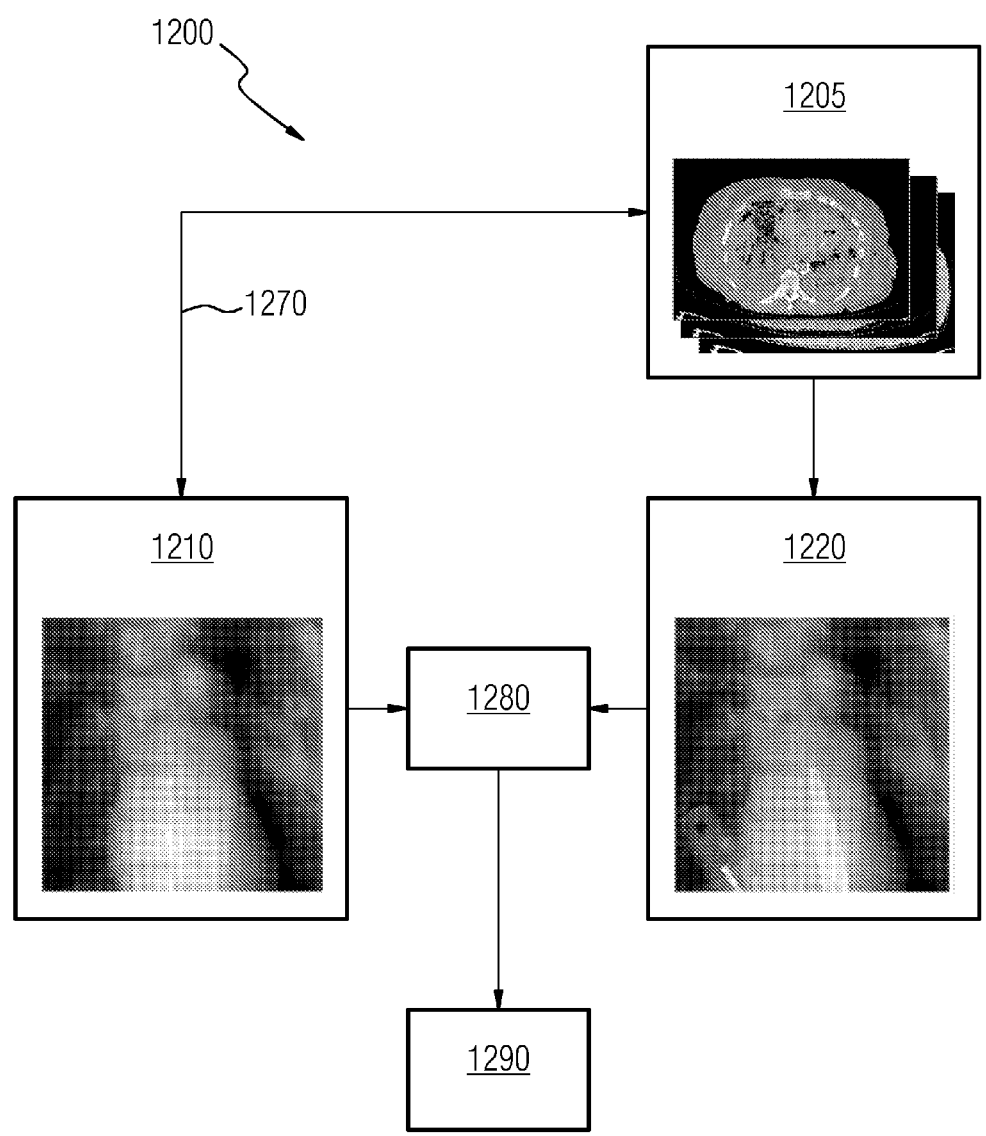

FIGS. 8A-8B are workflows 1100, 1200 of exemplary scenarios. FIG. 8A depicts a nominal case in which a CT image is acquired pre-operatively or intra-operatively for purposes of surgical planning within the usual standard of care. The workflow 1100 may comprise obtaining a pre-operative CT image 1105, obtaining an intra-operative radiograph or post intervention radiograph 1110, 3D-2D registering of pre-operative CT image 1170, generating DDR of registered preoperative CT image 1120, subtracting and/or comparing intra-operative radiograph or post intervention radiograph and DDR 1180, and comparing results and/or subtraction image 1190.

Alternative workflow scenarios may be envisioned. Intra-operative 3D imaging systems, for example intra-operative 3D imaging systems with an interventional C-arm or O-arm with cone-beam CT imaging capability or direct incorporation of a CT scanner in the OR, allow acquisition of the 3D images during an intervention.

Thus, another workflow scenario following the above-described same general principles regarding definition of the 3D structure in pre-operative CT allows registration of a structure defined in an intra-operative 3D image to the 2D radiographic image, with all the same functionality. This other workflow is similar to workflow of FIG. 8A except the "Pre-operative CT" is understood to be an "Intra-operative CT or Cone-Beam CT."

Yet another workflow scenario may be envisioned in a case, wherein no 3D CT image, i.e. neither a pre-operative CT image nor an intra-operative CT image or cone-beam CT image, is available, i.e. within the usual standard of care. Naturally, there is no pre-existing 3D image to which to register. In an event where a conventional precautionary measure, for example sponge counting, indicates a possible RFB, for example a "tool left behind". An x-ray radiograph acquired pre-operatively, being fairly common in the standard of care, and an intra-operative CT image, a cone-beam CT image or, if the patient has already left the OR, a post-operative CT image may be acquired on demand, i.e. in response to the need for identification of an RFB. The RFB may be conspicuous in the resulting 3D image. However, it can be challenging, for example owing to small size and tortuous nature of some devices, that may be difficult to see in 3D slices. Using this workflow scenario, the 3D-2D registration method according to the invention may be used, as described, for rendering the RFB clear in a difference image or a more sophisticated analysis of the pre-operative radiograph showing structures prior to intervention and the reconstructed image computed from of the intra-operative 3D CT image or post-operative CT image. This workflow is illustrated in FIG. 8B.

FIG. 8B depicts an alternative case in which intra-operative CT or post-operative CT, for example cone-beam CT, is invoked in response to suspicion of a retained foreign body. In the latter case, the same 3D-2D registration method using a 2D radiograph acquired just prior to intervention and an intra-operative or post-operative 3D image is applicable. The workflow 1200 may comprise, obtaining an pre-operative radiograph 1210, obtaining a intra-operative CT image or post intervention CT image 1205, 3D-2D registering of intra-operative CT image or post intervention CT image 1270, generating DDR of registered intra-operative CT image or post intervention CT image 1220, subtracting and/or comparing pre-operative radiograph and DDR 1280, and comparing results and/or subtraction image 1290.

Further Embodiments

While the invention has described with reference to the mobile radiography system as illustrated in FIG. 1, the invention is equally applicable to implementations on other medical devices such as imaging, diagnostic, surgical or therapeutic devices, wherein the geometric relationship between the source such as x-ray source and the detector is unconstrained, the geometric calibration is unknown or not well established or maintained, including, for example:

A mobile C-arm fluoroscopy, that may exhibit a high degree of irreproducible flex in the C-arm gantry;
 A ceiling-mounted C-arm or floor-mounted C-arm, wherein the geometric relationship of the source and the detector may be not well characterized or unknown;
 A radiography/fluoroscopy system integrated in an operating table, wherein the x-ray source and detector relationship may be not well calibrated;
 A radiography/fluoroscopy system on rails such as ceiling rails, floor rails or wall rails, wherein the x-ray source and detector relationship may be not well known;
 A chest radiography system or a under-table fluoroscopy system; and
 A radiation therapy linear accelerator gantry, robotic radiotherapy device or radiotherapy simulator, that may allow uncalibrated DoF between the source and the detector.

The structures such as "planning structures", the anatomy, and the devices including their locations and trajectories defined in the images such as 3D images are not limited to those described above and depicted in the figures. Further, the patient is not limited to a human patient. The body is not limited to a living body. Furthermore, the site such as surgical site is not limited to the chest depicted in the figures and may be equally useful in other applications with regard to other sites such as head, abdomen, leg and pelvis, where intra-operative radiographs are used in clinical routine for verification of the delivered surgical result and/or search for RFBs, including, for example, guidance for:

Other anatomical areas and structures, including head and neck, abdomen, pelvis, extremities, bones, vessels and nerves;
 Implanted devices visible in pre-operative images, for example stents, catheters and implants;
 Orthopaedic surgery as a means for a simpler alternative for advanced navigation system;

A variety of catheter procedure for guiding the tip of the catheter with respect to the planning data; and
Endoscopic surgery and natural orifice translumenal endoscopic surgery.

The illustrations of the embodiments described herein are intended to provide a general understanding of the structure of the various embodiments of the invention. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Combinations of the above embodiments, and other embodiments not specifically described herein, will be apparent to those of skill in the art upon reviewing the description.

The Abstract of the Disclosure is provided to comply with 37 CFR 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The following is a list of documents that are pertinent with regard to the above description:

[1] Otake Y, Schafer S, Stayman J W, Zbijewski W, Kleinszig G, Graumann, Khanna A J, Siewerdsen J H, "Automatic Localization of Vertebral Levels in X-ray Fluroscopy Using 3d-2d Registration: A Tool to Reduce Wrong-Site Surgery", Phys Med Biol, 57, (2012), pp 5485-5508.
[2] Navab N, Bani-Hashemi A, Nadar M S, Wiesent K, Durlak P, Brunner T, Barth K, Graumann R, "3d Reconstruction from Projection Matrices in a C-Arm Based 3d-Angiography System", Medical Image Computing and Computer-Assisted Intervention—Miccai'98, ed. by William M Wells, Alan Colchester, Scott Delp, Springer, Berlin Heidelberg, (1998), pp 119-129.
[3] McLaughlin R A, Hipwell J, Hawkes D J, Noble J A, Byrne J V, Cox T C, "A Comparison of a Similarity-Based and a Feature-Based 2-D-3-D Registration Method for Neurointerventional Use", IEEE Trans Med Imaging, 24, (2005), pp 1058-1066.
[4] Galigekere R R, Wiesent K, and Holdsworth D W, "Cone-Beam Reprojection Using Projection-Matrices", IEEE Trans Med Imaging, 22, (2003), pp 1202-1214.
[5] Otake Y, Armand M, Armiger R S, Kutzer M D, Basafa E, Kazanzides P, Taylor R H, "Intraoperative Image-Based Multiview 2d/3d Registration for Image-Guided Orthopaedic Surgery: Incorporation of Fiducial-Based C-Arm Tracking and Gpu-Acceleration", IEEE Trans Med Imaging, 31, (2012), pp 948-962.
[6] Pluim J P, Maintz J B, Viergever M A, "Image Registration by Maximization of Combined Mutual Information and Gradient Information", IEEE Trans Med Imaging, 19, (2000), pp 809-814.
[7] Hansen N, Kern S, "Evaluating the Cma Evolution Strategy on Multimodal Test Functions", Parallel Problem Solving from Nature—Ppsn Viii, ed. by Xin Yao, EdmundK Burke, José A Lozano, Jim Smith, Juan Julian Merelo-Guervós, John A Bullinaria, Jonathan E Rowe, Peter Tiňo, Ata Kabán, Hans-Paul Schwefel, Springer, Berlin Heidelberg, (2004), pp 282-291.
[8] Cabral B, Cam N, and Foran J, "Accelerated Volume Rendering and Tomographic Reconstruction Using Texture Mapping Hardware", Proceedings of the 1994 symposium on Volume visualization (Tysons Corner, Va., USA), ACM, (1994), pp 91-98.
[9] Siddon R L, "Fast Calculation of the Exact Radiological Path for a Three-Dimensional Ct Array", Med Phys, 12, (1985), pp 252-255.
[10] Long Y, Fessler J A, Balter J M, "3d Forward and Back-Projection for X-ray Ct Using Separable Footprints", IEEE Trans Med Imaging, 29, (2010), pp 1839-1850.
[11] Rogelj P, Kovačič S, and Gee J C, "Point Similarity Measures for Non-Rigid Registration of Multi-Modal Data", Computer Vision and Image Understanding, 92, (2003), pp 112-140.

The invention claimed is:
1. A method of 3D-2D registration for medical imaging, the method which comprises:
  a) providing a first input interface for acquiring a three-dimensional image;
  b) providing a second input interface for acquiring a fixed two-dimensional image using an imaging system comprising a source and a detector and having an unknown source-detector geometry;
  c) initializing image transformation parameters and source-detector geometry parameters;
  d) generating a reconstructed two-dimensional image from the three-dimensional image using the image transformation parameters and the source-detector geometry parameters;
  e) determining an image similarity metric between the fixed two-dimensional image and the reconstructed two-dimensional image; and
  f) updating the image transformation parameters and the source-detector geometry parameters using the image similarity metric.

2. The method according to claim 1, further comprising the step of:
g) repeating steps d) to f) until the image similarity metric has been maximized.

3. The method according to claim 1, wherein the image similarity metric is feature-based or intensity-based.

4. The method according to claim 1, wherein the image similarity metric comprises gradient information between the fixed two-dimensional image and the reconstructed two-dimensional image.

5. The method according to claim 1, further comprising the step of:
h) determining a quality metric quantifying a quality of the 3D-2D registration.

6. The method according to claim 4, wherein the updating step comprises using a numerical optimization algorithm (e.g., CMA-ES), using the similarity metric as a cost function:

$$\{\hat{t}, \hat{\theta}, \hat{s}\} = \underset{t,\theta,s}{\arg\max}\ GI(Image_{fixed}, Image_{reconstructed}(s_x, s_y, s_z, t_x, t_y, t_z, \theta_x, \theta_y, \theta_z))$$

where $s_x$, $s_y$, $s_z$ are source position coordinates $t_x$, $t_y$, $t_z$ are detector coordinates, $\theta_x$, $\theta_y$, $\theta_z$ represent the rotation, and GI denotes the gradient information similarity metric that is optimized in the registration process.

7. The method according to claim 1, wherein the updating step comprises using a parallel optimization.

8. The method according to claim 1, wherein the updating step uses a coarse-to-fine optimization having multiple resolution levels or two multiple resolution levels.

9. The method according to claim 1, wherein the three-dimensional image is an image selected from the group consisting of a computed-tomography image, a magnetic resonance image, a positron emission tomography image, a synthetic image, and an x-ray image.

10. The method according to claim 1, wherein:
the image transformation parameters comprise six degrees of freedom; and
the source-detector geometry parameters comprise three degrees of freedom.

11. The method according to claim 1, which comprises acquiring the three-dimensional image pre-operatively, intra-operatively or post-operatively.

12. The method according to claim 1, wherein the fixed two-dimensional image is an x-ray projection image.

13. The method according to claim 1, which comprises acquiring the fixed two-dimensional image pre-operatively, intra-operatively or post-operatively.

14. The method according to claim 1, wherein the imaging system is an x-ray radiography system or an x-ray fluoroscopy system.

15. The method according to claim 1, wherein the imaging system is a fixed-room system, an under-table system, an over-table system, or a mobile system.

16. The method according to claim 1, wherein the imaging system further comprises a C-arm.

17. The method according to claim 1, wherein the reconstructed two-dimensional image is a digitally reconstructed image.

18. The method according to claim 1, further comprising the step of:
generating a visualization image by overlaying the fixed two-dimensional image and the reconstructed two-dimensional image.

19. The method according to claim 17, wherein:
the three-dimensional image comprises surgical planning data;
the fixed two-dimensional image comprises information on a corresponding surgical result data; and
the visualization image verifies or documents the surgical result data.

20. The method according to claim 17, wherein:
the three-dimensional image comprises pre-operative information data;
the fixed two-dimensional image comprises post-operative information; and
the visualization image is able to visualize a retained foreign object.

21. A non-transitory computer-readable medium storing a program configured to cause a computer to execute the method according to claim 1 when the program is loaded onto the computer.

22. An apparatus for 3D-2D registration for medical imaging, the apparatus comprising:
a first input interface for acquiring a three-dimensional image;
a second input interface for acquiring a fixed two-dimensional image using an imaging system including a source and a detector;
said source and said detector being separate;
said imaging system having an unknown source-detector geometry;
an image generator module for generating a reconstructed two-dimensional image from the three-dimensional image using image transformation parameters and source-detector geometry parameters;
a determination module for determining an image similarity metric between the fixed two-dimensional image and the reconstructed two-dimensional image; and
an update module updating the image transformation parameters and the source-detector geometry parameters using the image similarity metric.

* * * * *